Figure 1:
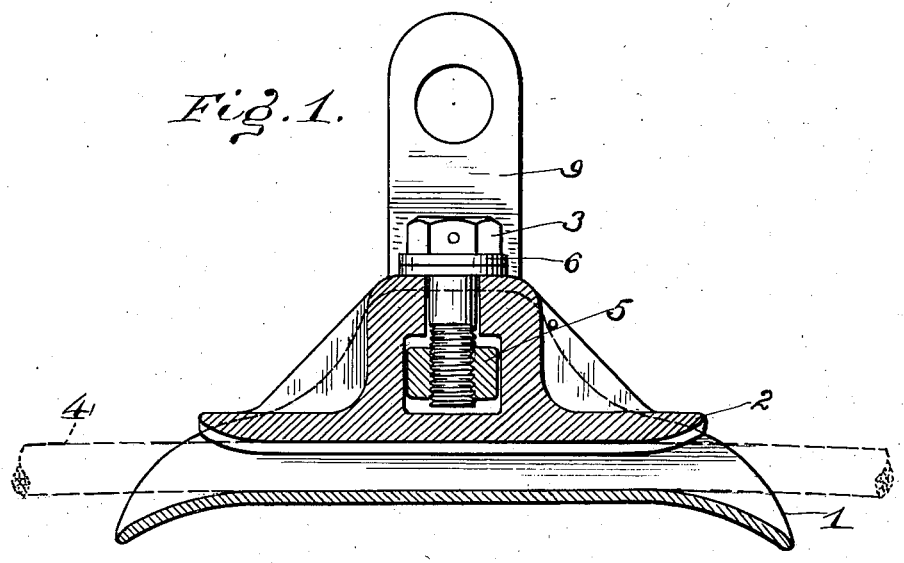

Oct. 20, 1936. M. PREISWERK 2,058,258

SUSPENSION CLAMP FOR OVERHEAD TRANSMISSION LINES

Filed July 2, 1935

INVENTOR:
Max Preiswerk
BY Morrison, Kennedy & Campbell
ATTORNEYS.

Patented Oct. 20, 1936

2,058,258

UNITED STATES PATENT OFFICE 2,058,258

SUSPENSION CLAMP FOR OVERHEAD TRANSMISSION LINES

Max Preiswerk, Neuhausen, Switzerland, assignor to Aluminum-Industrie-Aktien - Gesellschaft, Neuhausen, Switzerland, a joint-stock company of Switzerland Application July 2, 1935, Serial No. 29,447
In Germany July 19, 1934

4 Claims. (Cl. 248—63)

This invention relates to a new suspension clamp for overhead transmission lines.

For many years attempts have been made to avoid the breaking of overhead transmission lines. Means were invented for damping the mechanical vibrations of the conductors and many forms of suspension clamps were devised, as the breaking tends to occur in or close to the clamp. The different means which have been tried are subject to various serious drawbacks which cannot be overlooked. They are too intricate, too expensive, too heavy, require a very careful mounting, and have other objections.

The conductors (for instance cables) of overhead transmission lines are exposed to various different stresses in the already known suspension clamps; these stresses have often led to wire or cable breakings when mechanical vibrations occurred from high winds or otherwise. The vertical vibrations or swings cause the cable to be repeatedly flexed or bent up and down at the mounting point. The clamp follows these movements but slightly if at all, as it is generally too heavy, and has a high moment of inertia. The heavy parts of the clamp are too far from the axis of swing.

The clamps which were heretofore used have generally also the disadvantage that the conductor is pressed or clamped too tightly in it. If the screws are tightened without care, there can arise such high specific pressures on the conductor that its mechanical strength becomes lessened. This disadvantage occurs with suspension clamps of the kind in which the so-called "cover" (the upper part of the clamp) presses the conductor against the supporting (under) part of the clamp by means of several screw-bolts, whereby it happens too frequently that a lineman, who works without care, instead of tightening the screw-bolts gradually and symmetrically, tightens them unevenly, first one screw-bolt strongly, then the second, the third and so on. A careful study of numerous overhead transmission lines and examination of the wire and cable breakings have shown how important is a proper and careful mounting.

The fittings used in the erecting of overhead transmission lines should be constructed in such a manner as to prevent or minimize an improper mounting, which would be disadvantageous for the durability of the line. Suspension clamps should moreover be symmetrical, as has been found in numerous tests and in the practice.

This invention relates to a suspension clamp for overhead transmission lines, in which clamp the disadvantages of the known clamps are largely avoided. The clamp of this invention is composed essentially of a lower member or supporting part, on which is laid the conductor, and an upper member or part (cover) which is fitted to be pressed on the conductor by means of a single, central and preferably vertical screw or screw-bolt, acting as a clamp closer or tightener, which screw does not have to support the weight of the conductor. This insures a symmetrical and uniform pressure on the conductor and avoids improper mounting. It avoids the possibility of tightening one screw-bolt more than another, as there is only a single screw for pressing the entire cover member on the conductor; thus insuring a symmetrical pressure. It is also important for this purpose to have a central and vertical screw.

As the clamping screw has not the function of supporting the conductor, the cover part and supporting part will remain in their suspended position even if the screw should break in consequence of a defect of the material. The separate hanging devices remain operative.

The clamping screw hereof is engaged and tightened for instance into a nut, which nut serves simultaneously as an horizontal axis of swing for the clamp and as a connecting piece between the two clamping parts. The axis of swing lies in this case above the conductor, which has been found more advantageous than when the axis lies at the same height as the conductor or even under the conductor.

It is advantageous and preferred to make the supporting part of the clamp from bent sheet metal, obtaining thus a smooth support for the conductor. For conductors made of aluminum or aluminum alloy, also for steel cored aluminum cables and the like, it is preferable to use a supporting part and cover both also made of aluminum or aluminum alloy, especially because corrosions by contact are thus avoided, which appear when metals of different electrochemical potential are brought into contact one with the other. The cover (upper member of the clamp) is made for instance of an aluminum cast alloy. In a clamp which has proved very suitable for overhead transmission lines of aluminum or aluminum alloy the parts which come in contact with the conductor are made of aluminum alloy and the parts which are exposed to sliding stresses (screw-bolt, nut, pivot and so on) are made of galvanized or stainless steel or iron. As these parts of steel or iron are situated in the neighborhood of the axis of rotation, they increase only a little the moment of inertia of the clamp.

With this new suspension clamp, which can be made very light and easily movable, it is possible to arrange the line mounting to create at the clamp a node of vibrations instead of a reflection or vibration point. At a node the conductor is not subjected to appreciable bending stresses, the bending radius being large or infinite; on the contrary, the conductor is endangered at a reflection point, the bending radius being there small.

The drawing shows as an example a clamp according to the present invention.

Figure 2:
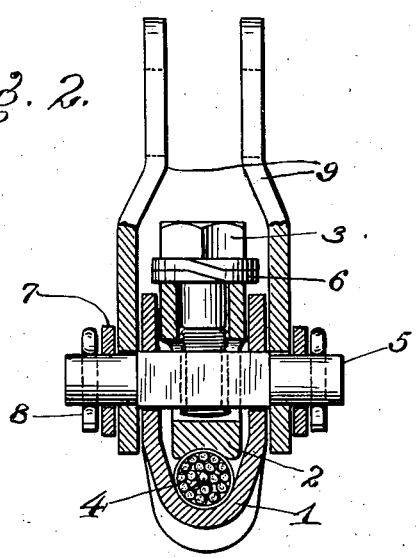

Fig. 1 is a vertical longitudinal section of a suspension clamp, Fig. 2 is a vertical cross section through the center.

The under or supporting part 1 is made of bent sheet metal and has a channel-like shape. The cover or upper clamp member 2 can be pressed upon the cable 4, which lies on the concave supporting part 1, namely by means of a screw-bolt 3. The screw-bolt 3 becomes tightened into the member or nut 5, which serves also as a horizontal axle or pivot of rotation. The nut member 5 connects the cover 2 with the supporting part 1. The screw-bolt, when tightened, closes the clamp and is locked by means of the spring or lock washer 6. Upon the nut-axle 5 are washers 7, and split or cotter pins 8, these confining the opposite supporting straps or hangers 9.

This example shows clearly that improper and injurious mounting is prevented, for one reason because there is only a single clamp screw or bolt to be tightened, which insures a symmetrical and uniform pressing of the cover against the conductor. Owing to the rigidity of the supporting part 1 and the cover 2 a bending or deformation of the cable is not to be feared, even if the screw-bolt should be very strongly tightened.

The straps 9 constitute a hanger piece, which suspends the combined clamp members and cable from a point above, and which is quite independent of the single clamp closer or screw 3. The mounting shown permits the clamp members and cable to pivot bodily about the axle or pivot 5 by which the hanger 9 suspends them.

The manufacture of the described clamp is easy, simple and cheap. By using a supporting part made of bent metal sheet, a smooth support for the conductor can be easily obtained.

There has been described an example of a suspension clamp for overhead transmission lines embodying the invention. Many matters of arrangement and construction may be variously modified without departing from the principles of the invention, and it is not intended to limit the invention to such matters except to the extent set forth in the appended claims.

What I claim is:

1. A suspension clamp for an overhead line comprising an under clamp member on which the line rests having upwardly extending sides at opposite sides of the line, an upper clamp member overlying the line between the sides of the under member, a vertical clamp closing screw operable to force down the upper relatively to the under clamp member for tightening the clamp upon the line, a combined nut and axle member, its central portion constituting a nut receiving the screw, and its ends constituting an axle engaged in the sides of the under member, and means for hanging the clamp by such axle.

2. A suspension clamp for an overhead line comprising an under clamp member on which the line rests, an upper clamp member overlying the line, a horizontal connecting piece connecting the two clamp members, a vertical clamp closing screw engaged substantially centrally in said connecting piece to force down the upper relatively to the under clamp member, and means independent of said screw for suspending the clamp by said connecting piece.

3. A suspension clamp for an overhead line comprising an under clamp member on which the line rests having upwardly extending sides at opposite sides of the line, an upper clamp member overlying the line between the sides of the under member, a vertical clamp closing screw operable to force down the upper relatively to the under clamp member for tightening the clamp upon the line, a combined nut and axle member, its central portion constituting a nut receiving the screw, and its ends constituting an axle engaged in the sides of the under member, and means independent of said screw and upper clamp member for hanging the clamp at the opposite sides of the under clamp member.

4. A suspension clamp for an overhead line comprising an under clamp member on which the line rests, an upper clamp member overlying the line, a horizontal connecting piece connecting the two clamp members, a vertical clamp closing screw engaged substantially centrally in said connecting piece to force down the upper relatively to the under clamp member, and opposite hanger straps independent of said screw and upper clamp member for suspending the clamp.

MAX PREISWERK.